US011086715B2

(12) United States Patent
Boettcher et al.

(10) Patent No.: US 11,086,715 B2
(45) Date of Patent: Aug. 10, 2021

(54) TOUCH INSTRUCTION

(71) Applicant: Arm Limited, Cambridge (GB)

(72) Inventors: Matthias Lothar Boettcher, Cambridge (GB); François Christopher Jacques Botman, Cambridge (GB); Jacob Eapen, Waterbeach (GB)

(73) Assignee: Arm Limited, Cambridge (GB)

( * ) Notice: Subject to any disclaimer, the term of this patent is extended or adjusted under 35 U.S.C. 154(b) by 252 days.

(21) Appl. No.: 16/251,503

(22) Filed: Jan. 18, 2019

(65) Prior Publication Data

US 2020/0233742 A1     Jul. 23, 2020

(51) Int. Cl.
*G06F 11/10* (2006.01)
*G06F 11/14* (2006.01)

(52) U.S. Cl.
CPC ...... *G06F 11/1044* (2013.01); *G06F 11/1016* (2013.01); *G06F 11/1415* (2013.01)

(58) Field of Classification Search
None
See application file for complete search history.

(56) References Cited

U.S. PATENT DOCUMENTS

| 8,055,976 B2* | 11/2011 | Kim | G06F 11/1012 |
| | | | 714/758 |
| 8,621,336 B2* | 12/2013 | Craske | G06F 11/1064 |
| | | | 714/799 |
| 8,751,833 B2* | 6/2014 | Hill | G06F 1/329 |
| | | | 713/300 |
| 9,582,295 B2* | 2/2017 | Gainey, Jr. | G06F 9/30076 |
| 9,594,576 B2* | 3/2017 | Gainey, Jr. | G06F 9/44505 |
| 10,545,772 B2* | 1/2020 | Gainey, Jr. | G06F 9/4405 |
| 10,552,175 B2* | 2/2020 | Gainey, Jr. | G06F 9/4405 |
| 2003/0043647 A1* | 3/2003 | Kanamori | G11C 16/3431 |
| | | | 365/200 |
| 2007/0089031 A1* | 4/2007 | Huffman | G11C 29/76 |
| | | | 714/763 |
| 2009/0044086 A1* | 2/2009 | Craske | G06F 11/1064 |
| | | | 714/799 |
| 2009/0049365 A1* | 2/2009 | Kim | G06F 11/1012 |
| | | | 714/767 |

(Continued)

FOREIGN PATENT DOCUMENTS

| AU | 2015230885 B2 * | 2/2018 | ......... G06F 9/30076 |
| CN | 104813409 A * | 7/2015 | ......... G06F 11/1048 |

(Continued)

OTHER PUBLICATIONS

IBM Technical Disclosure Bulletin, NN77044055, Class Interrupt Status Save, Apr. 1977. (Year: 1977).*

*Primary Examiner* — Steven G Snyder
(74) *Attorney, Agent, or Firm* — Nixon & Vanderhye P.C.

(57) ABSTRACT

An apparatus comprising data processing circuitry for processing data in one of a plurality of operating states, an instruction decoder for decoding instructions and error checking circuitry for performing error checking operations. In response to a touch instruction being decoded by the instruction decoder, error checking operation is performed on selected architectural state. The architectural state is architecturally inaccessible to the operating state. As a result of the touch instruction, the architectural state remains unchanged, at least when no error is detected.

20 Claims, 9 Drawing Sheets

(56) References Cited

U.S. PATENT DOCUMENTS

| | | | | |
|---|---|---|---|---|
| 2011/0271126 A1* | 11/2011 | Hill | ............... | G06F 1/3203 |
| | | | | 713/320 |
| 2013/0246770 A1* | 9/2013 | Farrell | ............... | G06F 11/3644 |
| | | | | 712/227 |
| 2015/0212906 A1* | 7/2015 | Gschwind | ............... | G06F 3/0629 |
| | | | | 714/15 |
| 2015/0268972 A1* | 9/2015 | Gainey, Jr. | ............... | G06F 9/4403 |
| | | | | 713/100 |
| 2015/0269117 A1* | 9/2015 | Gainey, Jr. | ............... | G06F 9/30076 |
| | | | | 713/2 |
| 2017/0124023 A1* | 5/2017 | Gainey, Jr. | ............... | G06F 9/4405 |
| 2017/0185430 A1* | 6/2017 | Gainey, Jr. | ............... | G06F 15/7867 |
| 2019/0339994 A1* | 11/2019 | Gainey, Jr. | ............... | G06F 9/30076 |
| 2019/0339995 A1* | 11/2019 | Gainey, Jr. | ............... | G06F 15/7867 |
| 2020/0004633 A1* | 1/2020 | Yigzaw | ............... | G06F 11/1405 |
| 2020/0089559 A1* | 3/2020 | Ainsworth | ............... | G06F 11/1407 |

FOREIGN PATENT DOCUMENTS

| | | | | | |
|---|---|---|---|---|---|
| GB | 2451668 A | * | 2/2009 | ............ | G06F 11/1064 |
| GB | 2555627 A | * | 5/2018 | ............ | G06F 11/1008 |
| GB | 2555628 A | * | 5/2018 | ............ | G06F 11/1641 |

* cited by examiner

| 1 | EL = 0 |
| 2 | MRS_EL1 $R_n$ |
| 3 | Touch $R_n$ |
| 4 | Touch |
| 5 | MRS_EL1 $R_n$ |
| 6 | Enter_touch_mode |
| 7 | MRS_EL1 $R_n$ |
| 8 | Exit_touch_mode |

FIG. 8

TOUCH INSTRUCTION

TECHNICAL FIELD

The present technique relates to the field of data processing.

BACKGROUND

In the field of data processing, processing circuitry may be provided to execute instructions according to a particular instruction set architecture. Execution of instructions may depend on architectural state stored in storage elements. Such storage elements may be susceptible to errors (e.g. caused by a particle strike) that can alter the stored values of the architectural state.

SUMMARY

At least some examples provide an apparatus comprising:
processing circuitry to perform data processing in one of a plurality of operating states;
an instruction decoder to decode instructions to generate control signals for controlling the processing circuitry to perform data processing; and
error checking circuitry to perform error checking operations; in which:
in response to a touch instruction, the instruction decoder is configured to trigger the error checking circuitry to perform an error checking operation on selected architectural state; and
the touch instruction is permitted to be executed in at least one operating state for which the selected architectural state is architecturally inaccessible to said at least one operating state;
wherein at least when the error checking operation identifies that the selected architectural state is correct, in response to the touch instruction the processing circuitry is configured to leave the selected architectural state unchanged.

At least some examples provide a data processing method for an apparatus comprising processing circuitry to perform data processing in one of a plurality of operating states; the method comprising:
decoding instructions using an instruction decoder to generate control signals for controlling the processing circuitry to perform data processing; and
in response to decoding of a touch instruction by the instruction decoder, performing an error checking operation on selected architectural state; in which:
the touch instruction is permitted to be executed in at least one operating state for which the selected architectural state is architecturally inaccessible to said at least one operating state;
wherein at least when the error checking operation identifies that the selected architectural state is correct, in response to the touch instruction the processing circuitry is configured to leave the selected architectural state unchanged.

Further aspects, features and advantages of the present technique will be apparent from the following description of examples, which is to be read in conjunction with the accompanying drawings.

BRIEF DESCRIPTION OF THE DRAWINGS

FIG. 8 shows an example of different ways of representing touch instructions.

DESCRIPTION OF EXAMPLE EMBODIMENTS

Figure 1:
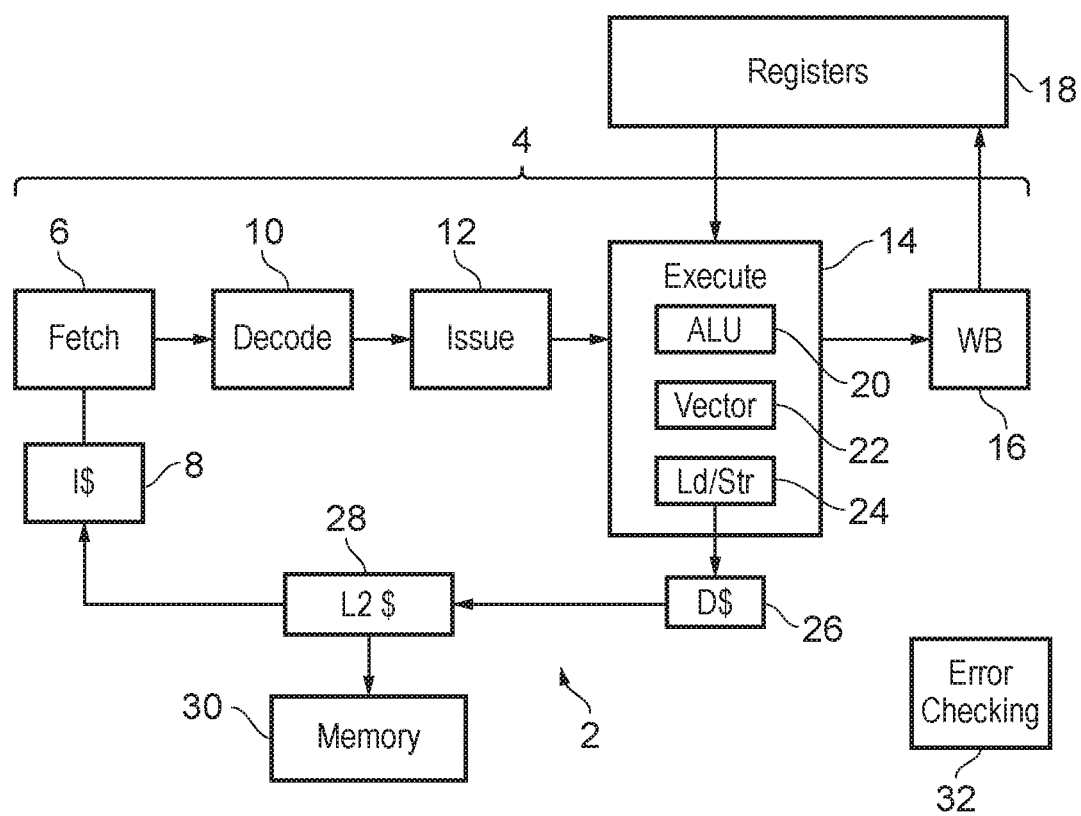
FIG. 1 schematically illustrates an example of a data processing apparatus.

Some specific examples are shown below. It will be appreciated that the invention is not limited to these examples.

Latent faults can occur when something, such as an alpha particle strike, changes one or more of the bits stored in a register, or other element of architectural state. To guard against such faults, data processing systems may be provided with error checking mechanisms that may be triggered when an element of architectural state is exercised, e.g. when its value is read, moved or written out to memory. However, in an architecture that comprises different architectural state accessible by different operating states, the elements of state are not all exercised with the same regularity. Elements that are exercised regularly have error checking triggered more frequently, whereas those not accessed for long periods do not.

Errors on these infrequently accessed elements may go undetected for relatively long periods of time. For example, elements storing architectural state restricted for access by a smaller subset of operating states may be exercised less often than elements storing architectural state accessible to a larger subset of operating states. Hence, for infrequently accessed architectural state, error detection may be performed less regularly, which may allow multiple errors to build up on a single element. If this occurs, errors can be more difficult (if not impossible) to detect and rectify in some systems. One approach for addressing this may be to run software tests every few seconds (exercising the infrequently exercised elements) and cores may be reset every few minutes to avoid build up of errors. This results in high overheads in terms of power and time spent offline (when the system is running the software tests, this may waste processing resource that could have been used for the regular processing to be performed).

The present technique provides a solution by which instructions can exercise infrequently accessed elements associated with higher privilege levels, and error checking is conducted on them, without the need to transition to a higher privilege operating state.

The processing apparatus of the present technology includes architectural state (such as registers), at least some of which is only accessible to instructions executed in a particular operating state.

The error checking circuitry may use one of a variety of methods to perform error detection and/or correction operations. As such the present technique is independent of which error checking method is used and can be widely applied to a number of system/architecture types. Some examples of error checking methods are described in detail below.

A touch instruction, according to the present technique, triggers the error checking circuitry to perform an error checking operation on a selected element of architectural state which is architecturally inaccessible to at least one operating state. While a non-touch instruction may not be able to access the selected element of architectural state when executed in that at least one operating state, the touch instruction is conversely permitted to be executed in that at least one operating state for which the selected architectural state is architecturally inaccessible. Hence, the touch instruction can be used to trigger error checking for the selected architectural state while the processing circuitry remains in the operating state in which that selected architectural state is architecturally inaccessible, so there is no need for the system to transition to another operating state. This means that the power and time costs associated with transitioning into a different operating state are not incurred.

In addition, authors of programs with instructions operating in states where elements of architectural state are inaccessible may not need to collaborate with authors of programs in which the state is accessible in order that error checking can be performed on the inaccessible element(s). For example, it may be necessary for an application (operating at a low privilege level) to ensure that stored values of architectural state restricted for access by an operating system (at a higher privilege level) are correct. To do this without using touch instructions, the developer(s) of the application would need to work with the developer(s) of the operating system to ensure that the operating system includes a routine for performing error checking on the architectural state which the application is not allowed to access, so that the application can periodically make a system call to trigger the operating system to perform the error checking routine, so that the system transitions to a higher privilege level, error checks the selected element and transitions back. The use of touch instructions negates this need for collaboration as the operating state remains at the lower privilege level while still being able to check the state restricted for access by the higher privilege level for errors. By avoiding need for collaboration between application and operating system developers, this can simplify and reduce costs of development of software intended to run on the processing system.

As a result of the touch instruction, the value of the selected architectural state does not change at least when it is determined to be free from errors. Touch instructions are therefore non invasive, and the security associated with the restriction of access to the selected architectural state based on the operating state of the processing circuitry can be maintained since even though the touch instruction can be executed in an operating state not allowed by the architecture to access the selected architectural state, the touch instruction does not change the stored value. Conversely, if an error is detected, the system may be equipped to correct that error, but the intended value held in the architectural state is not changed as a result of executing the instruction. The error correction merely restores the correct value which would have been stored, had the error not occurred. Hence, from the point of view of an instruction set architecture, the touch instruction has the behaviour of a no-operation instruction which does not result in any architectural change to the selected architectural state. This also aids compatibility with legacy processing systems which do not have support for the touch instructions, as a code sequence including touch instructions, which is written for an apparatus which does support touch instructions as discussed above, will have the same architectural behaviour on both the apparatus supporting touch instructions and on an apparatus not supporting touch instructions. Hence, legacy hardware or hardware not targeting reliability-sensitive markets can run applications that include touch instructions without any hardware modifications.

In at least one example of the present technique, the architectural state and operating states are governed by privilege levels. These are levels which define which elements of architectural state are accessible to instructions executed in certain operating states. As such, operating states with greater levels of privilege are those with access to more elements of architectural state. Less privileged operating states may have access to fewer elements.

When operating in a given privilege level, the instructions executed may have access to all elements of architectural state associated with that privilege level and state associated with lower privilege levels. In other words, an element of architectural state may be architecturally accessible to those instructions executed in an operating state of a threshold level or higher. For example, a register associated with privilege level 1 may be accessible to instructions executed in an operating state with privilege level 21. Hence, the touch instructions may therefore be permitted to be executed in less privileged states, accessing higher privilege elements of architectural state which would be inaccessible to non-touch instructions executed in the same less privileged operating state. Hence, the selected architectural state may be state which is restricted to be architecturally accessible to operating states with at least a threshold level of privilege, and the at least one operating state may comprise a less privileged operating state than the threshold level.

According to an embodiment of the present technology, the effect of the touch instruction may be invisible to subsequent instructions executed by the execution circuitry. While the execution of the touch instruction in the at least one operating state may cause the selected architectural state to be made accessible to the error checking circuitry even though the at least one operating state is not allowed to access that selected architectural state, the selected architectural state is not made architecturally visible to any subsequent instructions, which are operating in a state in which they would not normally be able access that architectural state. Hence, lower privilege instructions are able to access the values held in higher privilege architectural state for the purpose of error checking, but not in such a way that the value can be moved or amended or made visible to subsequent instructions. With touch instructions, the security concerns mentioned above associated with accessing higher privilege level architecture are reduced, as a touch instruction neither reads nor changes the values held in any architecturally inaccessible state.

It will be appreciated that there are several ways in which a touch instruction could be identified as such. In at least one example, the touch instruction may be assigned a dedicated opcode to identify it. In some examples, only one variant of the touch instruction may be provided, so that the particular architectural state identified as the selected architectural state may be implicit. E.g. touch instructions may only be supported for triggering error checking on one specific piece of architectural state, or on one specific class of architectural state (such as any architectural state not accessible by the lowest privilege level, or all system registers, or all flags, or all groups of debug registers). In other examples, different dedicated opcodes can correspond to touch instructions which access different architectural state or different classes of architectural state as the selected architectural state. Hence, the touch instructions may directly specify an element of architectural state, such as a register, that is to be the subject of the error checking process, either through the opcode as discussed above, or in other examples by using an immediate field within the instruction. Hence, the instruction decoder may be able to determine the register ID of the state to be checked for errors directly from the encoding of the instruction.

However, in other embodiments, the touch instruction may specify a register that holds the address of the element that is to be error checked. That is, the instruction specifies a register, and that register specifies the element of architectural state that is to be checked for errors.

In some implementations which use a register to identify the selected architectural state, the value in the register specified by the touch instruction may be updated as a result of the touch instruction. This could provide support for a software developer to provide a loop which repeatedly executes a touch instruction, where the instruction decoder responds to the touch instruction in each iteration of the loop by triggering the error check on an item of state and automatically updating (e.g. incrementing or decrementing) the value in the register which identifies the selected architectural state, so that the loop as a whole can cycle through registers to be checked for errors, without needing explicit instructions for updating the identifier of the selected architectural state. This can help to reduce code size.

In another embodiment, the architectural state to be checked is specified using a vector register. In this case, the touch instruction specifies an identifier of a vector register, and that vector register stores a plurality of indicators as to which elements of architectural state should be touched (checked for errors). This could be an efficient way to ensure that multiple elements of architectural state are error checked with a single instruction. This method can reduce code size and increase performance.

Another method of identifying a touch instruction as such may be to use a touch prefix instruction. In this case the prefix instruction may be issued immediately before a (ordinarily) non-touch instruction indicating that it should instead be interpreted as a touch instruction. This means that no dedicated opcode is required, instead existing opcodes are interpreted differently when preceded by the touch prefix. This method may be more flexible, providing different variations of touch instructions depending on the non-touch opcode. With this approach, a non-touch instruction which accesses a particular piece of architectural state is repurposed as a touch instruction for triggering error checking on that piece of architectural state.

In some examples, the selected architectural state (for the non-touch instruction which was decoded as a touch instruction due to being preceded by a touch prefix instruction) may be the architectural state which would be accessed by the non-touch instruction (the selected architectural state may in this case not need to be explicitly identified in the non-touch instruction, if it is implicit from the opcode, for example). If the non-touch instruction would ordinarily trigger a predetermined operation which would expose the value of the selected architectural state to subsequent instructions (e.g. by moving the value to another register) or modify the value of the selected architectural state, then that predetermined operation may be suppressed when the non-touch instruction follows a touch prefix instruction which signals that the non-touch instruction should instead be treated as a touch instruction.

In other cases, the selected architectural state selected for the subsequent non-touch instruction may be selected depending on a property of the touch prefix instruction. The property of the touch prefix instruction could be the instruction opcode or another parameter specified by the instruction. This can be useful as certain instructions may be executed differently depending on current privilege level of the processing circuitry. For example, one type of instruction could access different architectural state (e.g. one of a set of banked registers) selected based on the current privilege level. Two or more variants of the touch prefix instruction could be provided, e.g.:
  a first touch prefix instruction for which the selected architectural state for the subsequent non-touch instruction should be the architectural state which that non-touch instruction would access in the current privilege level; and
  a second touch prefix instruction, for which the selected architectural state for the subsequent non-touch instruction should be the architectural state which that non-touch instruction would access if it was executed in another privilege level different from the current privilege level.

For example, a stack pointer accessing instruction could access a first stack pointer register SP_EL1 if executed in a first privilege level EL1 and a second stack pointer register SP_EL2 if executed in a second privilege level EL2. A variant of the touch prefix instruction "prefix_touch_EL1" could be provided, which if executed in EL2 and followed by a stack pointer accessing instruction, would cause that stack pointer accessing instruction to trigger error checking on the first stack pointer register SP_EL1 instead of the second stack pointer register SP_EL2 which that subsequent instruction would normally access if executed in the second privilege level.

Another approach may be to invoke a touch mode. This is where, in response to a touch mode entry instruction, all or a subset of subsequent non-touch instructions are interpreted as touch instructions, until a touch mode exit instruction is decoded. This technique represents a small opcode overhead, and existing instructions can be reused as touch instructions, when they follow the touch mode entry instruction. As for the touch prefix example, the selected architectural state for such a touch instruction may be the architectural state that would otherwise be accessed by the non-touch instruction, and if the non-touch instruction would have triggered the predetermined operation to expose or modify the selected architectural state, that predetermined operation may be suppressed when the instruction is executed in touch mode.

In some implementations, the touch instruction may trigger one or more micro-operations (µops), including at least a store micro-operation specifying a value of the selected architectural state as target data to be stored to memory and specifying a dummy address as a target address. A store micro-operation may be a micro-operation which would trigger saving of the value stored in a target register to a memory location identified by the target address.

This approach can be particularly useful because in some implementations, error checking may not be carried out in response to all instructions which access architectural state. For example, to reduce power consumption and unnecessary error checks, some systems may only trigger error checking when a store operation is executed, on the assumption that an error in a register not subject to a store operation would become apparent later when a value which depends on the value in that register is stored to memory. This ensures error checks happen frequently enough to be useful, but not so often that they become a burden.

Hence, by triggering a store micro-operation in response to the touch instruction, this can ensure that the error checking process is triggered for checking the selected architectural state for memory. As the target address for this store micro-operation is a dummy address, this fulfils the requirement that the touch operation be invisible to subsequent instructions. The dummy address being fictitious indicates that the value does not get stored anywhere in memory (memory access circuitry may suppress the actual storage to memory when it detects that the target address is a dummy address). Hence, the dummy address is a way to trigger this existing error check from the store op without storing the value. However, as the value held in the register would not be changed, nor actually stored in memory, the instruction is both non-invasive and invisible as required by the touch instruction.

In some examples, the at least one micro-operation triggered by the touch instruction could also include a move micro-operation which moves the selected architectural state from the register storing the selected architectural state to a dummy register which is not architecturally accessible to instructions executed in the at least one operating state in which the touch instruction is executed. This can be useful because in some instruction set architectures it may not be possible for store instructions to specify, as their source operand, some system registers which store certain items of architectural state. By providing a move micro-operation which moves the selected architectural state to a dummy register, this dummy register can then be specified as the source of the store micro-operation, but as the dummy register may not be a general purpose register accessible to all operating states, this still prevents the touch instruction from making the selected architectural state visible to subsequent instructions.

A non-touch instruction, in the context of the present technique is one which obeys "normal" rules in accessing architectural state. Error checking circuitry may be triggered when a non-touch instruction is executed; however, a non-touch instruction that accesses selected architectural state cannot be executed if the selected architectural state is architecturally inaccessible in the current operating state. That is, non-touch instructions are only executable if they are executed in an operating state that can access the specified architectural element. For example, if the target register is associated with a higher privilege level than the current operating state, a non-touch instruction cannot be completed.

The error checking circuitry may operate in one of several ways to detect or correct errors. It will be appreciated that error checking methods other than those disclosed below may be used within the scope of the present technology. Using error detection codes (EDCs) or error correction codes (ECCs) is a technique for detecting errors. The value stored in a register has an EDC or ECC stored alongside it. This is generated using a function applied to the stored value (the EDC may for example be a parity bit, indicating if the number of 1's stored in the register is odd or even). Other forms of EDC such as cyclic redundancy checks (CRC) or checksum codes may be implemented. Also, block codes, convolutional codes or other ECCs may be used. The error checking circuitry checks the EDC (ECC) at a later point to compare it with a regenerated code from the stored value. If there is a discrepancy this indicates an error in the stored value. The term "error detecting code" is used herein to encompass both EDCs (codes which enable error detection but not correction) and ECCs (codes which enable both error detection and correction). As the ECC enables detection of the error as well as further providing a way that the value might be corrected once it has been detected, the ECC is still regarded as an error detecting code.

Another method of error checking is the performance of multiple instances of the same process. In this case, the architectural state corresponding to each different instance should, in the absence of any errors, hold the same values. As such, the error checking circuitry can compare the values of the architectural state generated for the respective instances to determine if an error is present. This error checking process may be triggered by touch or non-touch instructions. If only two instances are performed, the error checking process can determine if a fault has occurred, but it cannot be corrected, this would then need to be dealt with by resetting the core. If three or more instances are compared and one error has occurred, this can be corrected as the error will be on the anomalous one of the three instances. The multiple instances may be run on the same core in series, or in parallel on different cores.

In some embodiments, the multiple instances described above may be run in parallel on different processor cores. In this case, the error detection process may compare corresponding registers from each core; this can be in response to a touch or non-touch instruction according to the present technique.

The error checking circuitry according to at least one embodiment of the present technology may comprise dedicated circuitry to perform the error checking process. It may alternatively comprise processing circuitry under the control of microcode or some other software for performing error checking. The microcode could for example be stored in read only memory within the data processing system, hence this may be code fixed for the platform to implement the error checking functionality built into the system, rather than programmable code which can be provided by the user of the system.

FIG. 1 shows an example of a processing apparatus 2 comprising a processing pipeline 4 for performing data processing in response to instructions. The pipeline 4 includes a number of pipeline stages including a fetch stage 6 for fetching instructions from the instructions cache 8 and a decode stage 10 for decoding the fetched instructions. The issue stage 12 issues instructions for execution at the execution stage 14; a write back stage 16 may write the result of the execution back to a register in the register bank 18.

The execute stage 14 may include a number of functional units such as an arithmetic/logic unit (ALU) 20, a vector unit 22 or a load/store unit 24. It will be appreciated that FIG. 1 is merely schematic and for conciseness it does not show all possible components of the execute stage 14.

As shown in FIG. 1, the apparatus may also comprise a memory system including a level 1 (L1) data cache 26, a level 2 (L2) cache 28 and a main memory 30. It will be appreciated that there could be more than two levels of cache. It will also be appreciated that FIG. 1 only shows some of the possible pipeline stages of the data processing apparatus 2.

In the present embodiment, error checking circuitry 32 is provided to check errors within the apparatus. These errors affect values in the registers 18, and the error checking circuitry is therefore configured (using a technique such as using error detection codes EDCs) to confirm that the values being held are correct.

The error checking circuitry may comprise dedicated logic to perform the checking process, by a method such as using EDCs. Alternatively, it may comprise software (in the form of micro-code) to perform the error checking.

In addition to checking if there is an error affecting a particular register or element of architectural state, the error checking circuitry may be configured to correct such an error. This could be done using EDCs, a triple core lockstep system or some other form of three or more way redundancy. An example of a triple core lockstep system is described in more detail with reference to FIG. 6.

Figure 2:
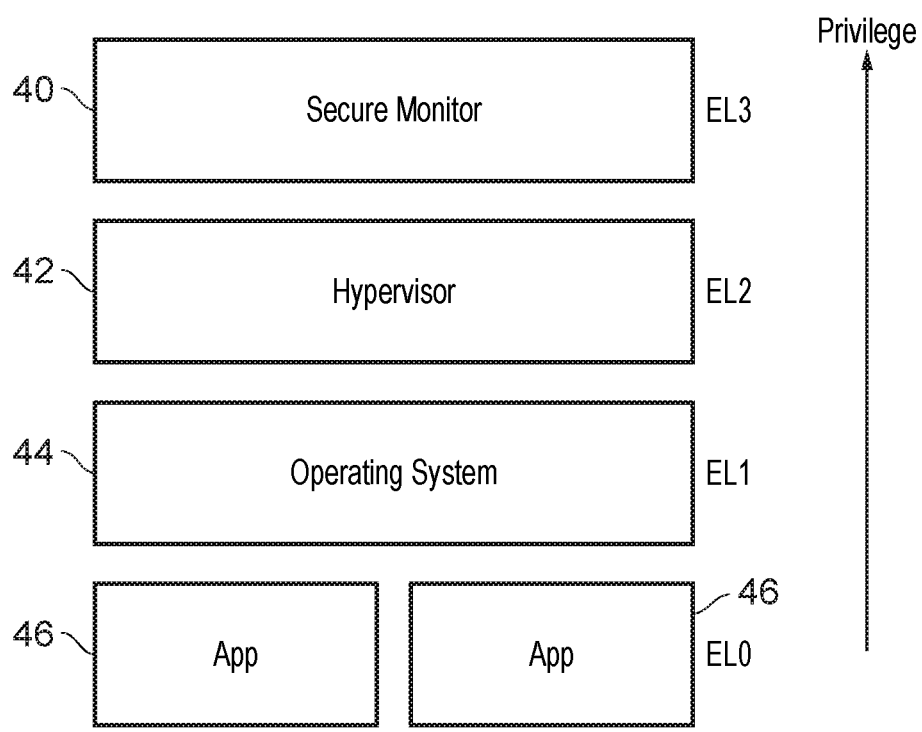
FIG. 2 schematically illustrates a hierarchy of programs operating at different privilege levels.

In FIG. 2, an example configuration is shown of different programs that can be executed on a processing apparatus such as that shown in FIG. 1. The different programs can be classed as operating in different operating states. The more privileged programs (e.g. operating at higher exception levels) such as the secure monitor and the hypervisor have more access to elements of architectural state. The secure monitor operates at the highest privilege level EL3, it has more architectural access than the hypervisor 42, which in turn has more access than the operating system 44, which has more privilege than the applications 46. While FIG. 2 shows only one hypervisor and operating system for conciseness, it will be appreciated that there could be multiple hypervisors and/or multiple operating systems.

As such, the programs with a higher privilege level have more access to elements of architectural state, applications for example have less access. This is primarily to stop less crucial programs such as applications from disrupting the overall running of the machine. For example, it would be undesirable for applications to take control of aspects of the operating system, but the operating system may be able to override decisions made by the application.

It will be appreciated that the operating state and architectural state may not be described as having varying privilege. However, the scope of the current invention includes any implementation whereby an aspect of architectural state is deemed inaccessible to non-touch instructions when the system is operating in a given operating state.

Figure 3:
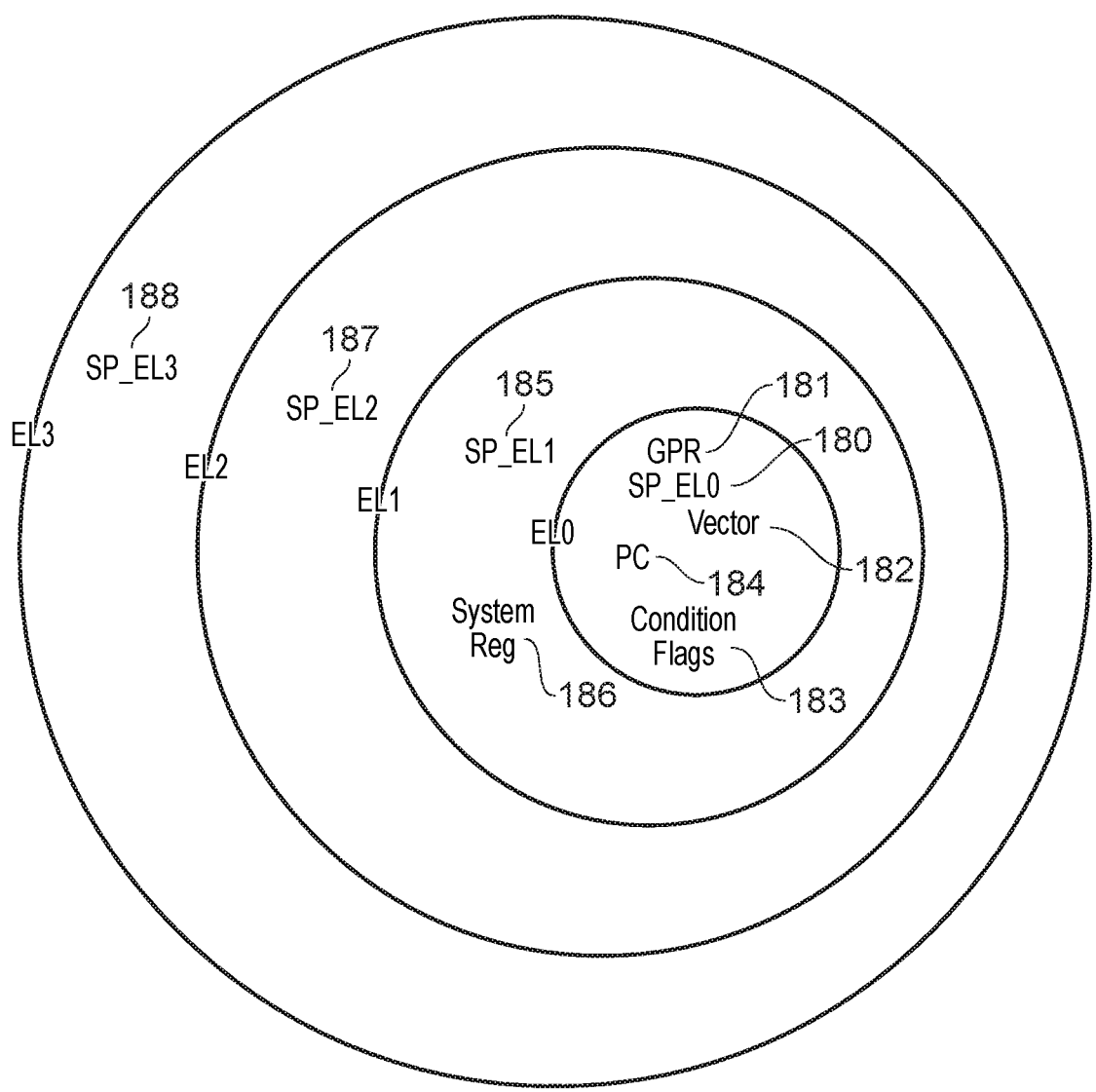
FIG. 3 illustrates examples of elements of architectural state which are architecturally accessible to different operating states.

FIG. 3 further shows an example of some of the elements of architectural state which may be accessible to the system operating at some given execution levels. The General Purpose Registers (GPRs) 181 including SP_EL0 180, Vector Registers 182, Condition Flags 183 and PC 184 fall within EL0, and can be accessed by all of the execution levels. The banked stack pointer (SP) register for EL1 (SP_EL1) 185 and the System Registers 186 are accessible to operating states EL1 and higher and so on (further banked stack pointer registers 187, 188 may be provided for operating states EL2, EL3 respectively). As such, the states with lower privilege level can access fewer elements of architectural state. It will be appreciated that the figure is an example of some elements that could comprise architectural state, and many more components may in fact make up the architectural state of the system.

Figure 4:
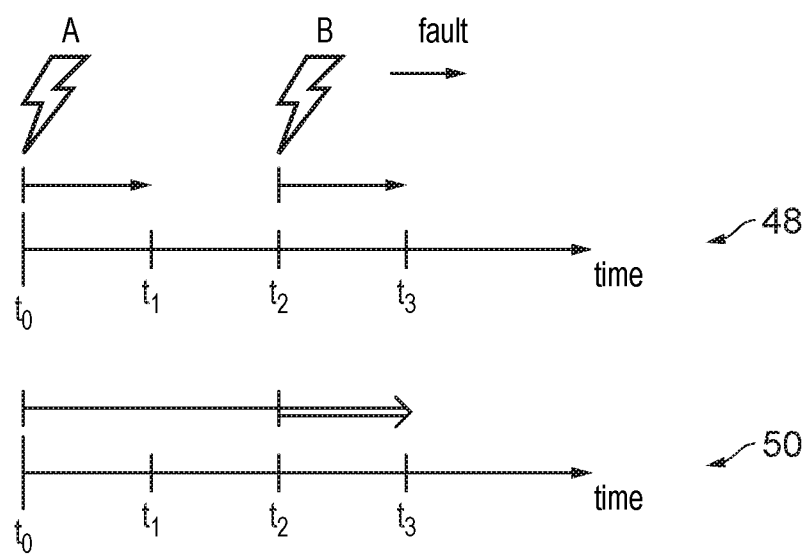
FIG. 4 schematically illustrates an example timeline of the occurrence and detection of faults.

FIG. 4 shows two timelines 48 & 50 in which two faults occur affecting a single element of architectural state. Fault A occurs at time $t_0$ and fault B occurs at time $t_2$. The time between the occurrence and detection/correction of a fault is known as the vulnerability interval.

The bottom timeline 50 shows a conventional, slower approach to error detection on a redundant element of state, the faults A & B occur at times $t_0$ and $t_2$ respectively. The error checking circuitry is triggered at time $t_3$. Thus, the vulnerability interval due to fault A is $t_0$-$t_3$, as the second fault occurs during this interval, at time $t_3$ there are multiple faults affecting the selected element of architectural state. As previously discussed, this build up of multiple faults can be difficult for error checking circuitry to detect and correct. This is the situation that the present technique aims to avoid.

The top timeline 48 shows the same faults occurring at times $t_0$ and $t_2$, but in this case, the faults are detected and corrected using an early detection method. The first fault A occurs at time $t_0$ and is then detected and corrected at time $t_1$. Thus, the vulnerability interval is $t_0$-$t_1$, dramatically shorter than that of the lower timeline $t_0$-$t_3$. At time $t_2$ the second fault B occurs and persists until at time $t_3$ the error checking circuitry is triggered for a second time. The vulnerability interval for this fault is therefore $t_2$-$t_3$. Thus, only a single fault is present on the selected element at a time, and so both faults can be corrected.

If the fault affects architectural state which is not accessible to application-level code operating in operating state EL0 (e.g. state 185, 186 shown in FIG. 3), then without support for touch instructions, triggering error checks sufficiently often to ensure both faults A and B can be detected could require frequent system calls to the operating system executing at EL1 so that the operating state can execute instructions which exercise the architectural state 185-186 restricted to access to EL1 or higher. Similarly, the operating system code may need to call the hypervisor or secure monitor if error checks of the architectural state 187 or 188 shown in FIG. 3 are required. Frequent system calls to a higher privilege operating state may be harmful to performance, provide a potential risk to security and create more complication in requiring coordination between different code developers of code intended to run at different operating states.

In contrast, with touch instructions as discussed below, the touch instructions can trigger error checking of state 185-188 accessible to operating states of greater privilege than the current operating state, without needing to leave the current operating state. This makes it much simpler for the code operating in the current operating state to trigger error checks of such architectural state sufficiently often to avoid multiple faults building up on an element of architecture and minimise the vulnerability intervals of faults without using non-touch instructions to excite the architecture.

Figure 5A:
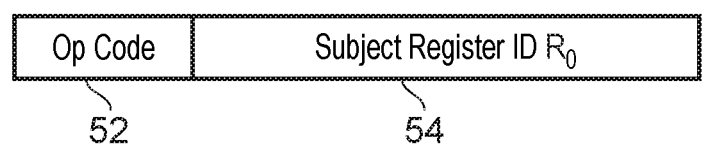
FIGS. 5a & 5b schematically illustrate examples of touch instruction encoding.

FIG. 5a illustrates an example of how a touch instruction may be encoded according to an embodiment of the present technology. In one embodiment the opcode 52 may identify itself as a touch instruction, whilst the subject register ID 54 indicates a register where an identifier of the selected architectural state to be checked for errors is stored. For example, the identifier in the subject register 54 may be a register address or other identifier pointing to the architectural register storing the selected architectural state. Although this approach represents an opcode overhead, having a dedicated opcode for touch instructions means that such instructions can be more easily targeted and their decoding is simplified.

Figure 5B:
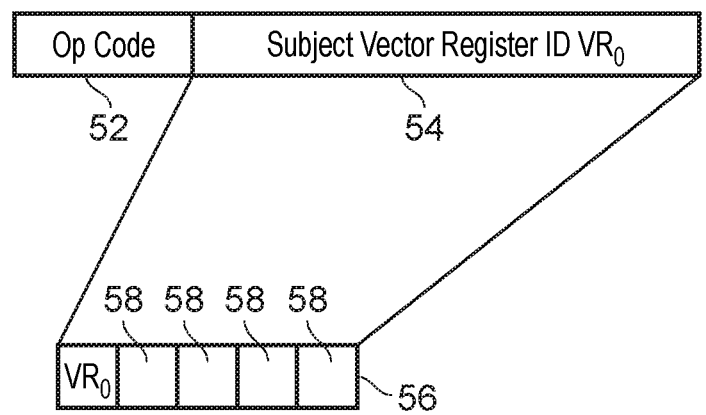

FIG. 5b illustrates an example of how a touch instruction may be encoded to touch (check for errors) multiple registers, using a vector register. As in previous examples the opcode 52 identifies the instruction as a touch instruction. The subject vector register ID 54 identifies a vector register 56 which stores the identifiers 58 of the registers storing the architectural state to be touched (checked for errors). This way, a single instruction is used to apply touch functionality to multiple elements of architectural state. This method improves code density and is potentially faster.

Figure 6:
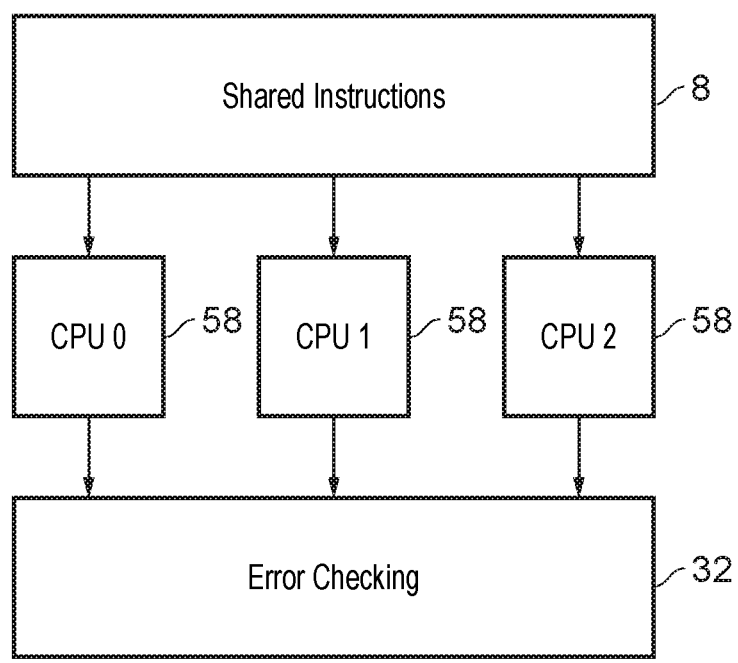
FIG. 6 schematically illustrates an example of a triple core system as a method for error checking.

FIG. 6 shows an example of a triple core system for error checking. It will be appreciated that a double core system could be applied to determine the presence of faults, in a similar way. Also, more than three cores may be used, although in practice this may not be an efficient use of hardware resource. The three cores 58, 58, 58 share an instruction cache 8 and process the same instruction sequence. These instructions may include touch and non-touch instructions. Each core 58 therefore has its own fetch, decode and issue stages as well as execute modules and registers. If working correctly, each core 58 should have registers which hold the same values as the corresponding registers in the other cores (after initialization). The error checking circuitry 32 compares outputs of the cores (e.g. values to be stored to memory in response to store instructions) and therefore can detect/correct any faults if one of the outputs is anomalous. This prevents the propagation of faults into state such as memory contents held outside the cores. In one embodiment of the present technology, the touch instruction would trigger a value held in a register to be output from a core to the error checking circuitry, e.g. by the instruction decoder mapping the touch instruction to at least one micro-operation including a store micro-operation as discussed above. The outputs of the cores would then be compared with the corresponding outputs at the other cores and any differences can be detected. Where there are two cores only, an error can be simply detected if the two values do not match. In a triple core system, if two of the values match and the third is anomalous, it can be identified that this third element has an error and the value can be corrected to match the other two. Relevant state held by the faulty core might then be re-initialized with the correct state provided by either of the other two cores. Any double core or triple core lockstep technique can be used for the error checking.

Figure 7:
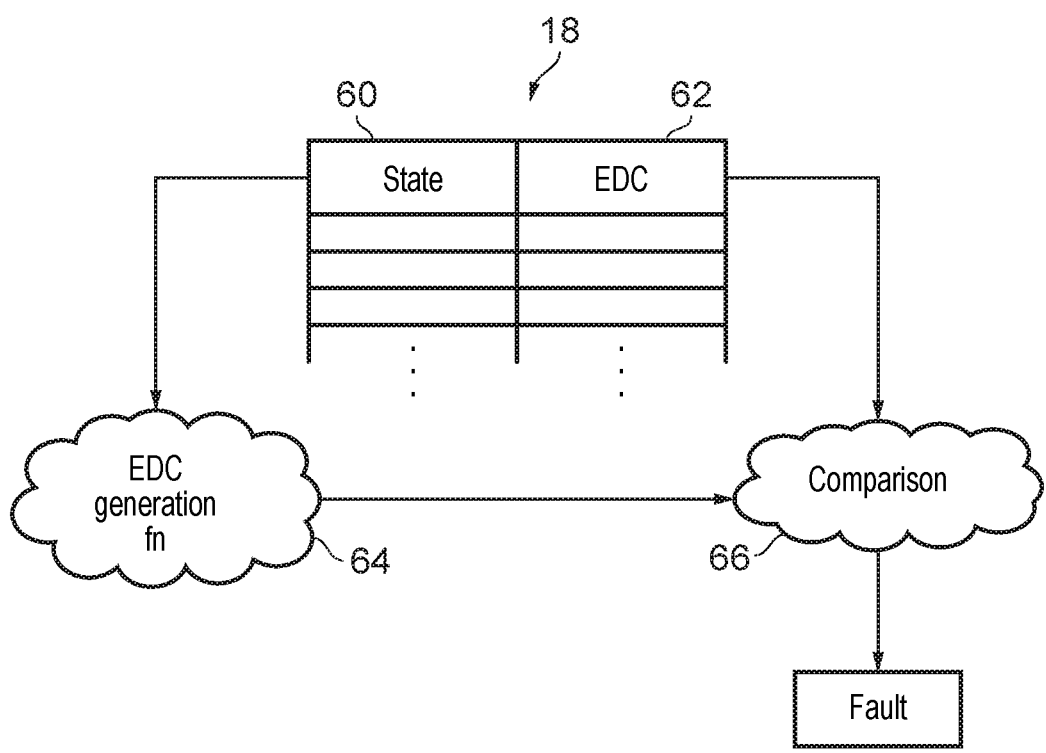
FIG. 7 schematically illustrates an example using error detection codes (EDCs) as a method for error checking.

Another method of error detection is illustrated schematically in FIG. 7. The registers 18 store a value (state) 60 and a corresponding error detection code (EDC) 62; this could be a parity bit, or other form of EDC (including ECCs which provide more redundancy to give more information to enable the value held by the register to be corrected when an error is detected). To perform error checking, the EDC generation function 64 is applied to the stored value. This is then compared with the EDC stored in the register using a comparator 66, a difference between the newly generated code and the stored code thereby indicating an error. In an embodiment of the present technology, this generation and comparison process may be triggered by a touch or non-touch instruction. Non-touch instructions which update architectural state may trigger the generation of the stored EDC 62 by applying the same EDC generation function 64 to the value being stored in the corresponding register. Touch instructions may trigger the error checking process shown in FIG. 7 to be applied to selected architectural state, even if executed in an operating state which is not architecturally allowed to access that selected architectural state.

FIG. 8 gives a hypothetical instruction stream to be decoded by the instruction decoder. This is intended as an example only, it will be appreciated that not all of the implementations described below are necessarily used in the same system. That is, the example of FIG. 8 is not a realistic code example expected to be provided in practice, but simply shows a number of instruction examples in one diagram for conciseness and ease of explanation.

Line 1 indicates that the system is operating in execution level 0, the least privileged operating state. Thus the smallest amount of architectural state is available to instructions executed in this state.

The instruction at line 2 is an MRS (move value from general purpose register to system register) instruction, which specifies a source register $R_n$ from among the general purpose registers 181. The source register $R_n$ stores a data value to be moved to the system register 186 which is only accessible to EL1 or higher. Hence, as the current operating state is EL0, the attempt to execute the MRS instruction would trigger an exception as this is a non-touch instruction and no previous touch prefix or touch mode instruction has been encountered to convert it into a touch instruction.

Line 3 shows a dedicated touch instruction, indicating that the contents of register identified by the ID held in register $R_n$ should be error checked. The ID held in register $R_n$ may identify one of the pieces of architectural state 185, 186, 187, 188 which is only accessible to operating states of greater privilege than EL0. As this is a touch instruction, no exception would be raised in this case, despite the execution state remaining at EL0. Unlike non-touch instructions, touch instructions which trigger error checking on state restricted for access by EL1-EL3 are permitted to be executed in EL0.

Line 4 shows an example of a touch prefix instruction, indicating that the following instruction on line 5 should be interpreted as a touch instruction. The instruction at line 5 is the same as the MRS instruction shown in line 2. Thus, although on its own the non-touch instruction on line 5 would raise an exception, when preceded by the touch prefix, it is interpreted as a touch instruction and executed as such therefore no exception is raised despite the current operating state being EL0 and the MRS instruction being an instruction for modifying the system register 186 which is not allowed to be accessed in EL0. For the MRS instruction, the selected architectural state to be checked for errors may be the system register 186 which would normally be updated by the MRS instruction and which is restricted for access by operating states EL1-EL3. The modification of the system register 186, which would normally be triggered by the MRS instruction when executed as a non-touch instruction, may be suppressed when the MRS instruction is treated as a touch instruction due to the presence of the touch prefix instruction preceding it. Note that this implies that the register operand—i.e. Rn in line 5—specified as part of the MRS instruction becomes obsolete. An implementation may therefore decide not to read the operand Rn from the registers 18 to save power and potentially improve performance by avoiding the underlying data dependency.

In this example, a single variant of touch prefix instruction is shown, but as discussed above it would also be possible to provide a variant of a touch prefix instruction which indicates that the subsequent instruction should be treated as a touch instruction and that the selected architectural state should be the state which that subsequent instruction would have accessed if it was executed in a specific operating state (which may be different from the current operating state). A property of the touch prefix instruction (e.g. the opcode, or a parameter specified in the touch prefix instruction either using an immediate value or with reference to a register identified by the touch prefix instruction) could be used to identify which specific operating state should be selected.

Line 6 shows an instruction indicating that the system should go into touch mode. The subsequent instructions are therefore interpreted as touch instructions according to the present technique, until touch mode is exited. The touch mode exit instruction is shown on line 8. Again, in this example an MRS instruction at line 7 is the same as in lines 2 and 5, and because it is between the touch mode entry and exit instructions, it is treated as a touch instruction in the same way as the MRS instruction at line 5. Although separate touch mode entry/exit instructions are shown in FIG. 8, in some implementations, the same instruction encoding could be used for both the touch entry/exit instructions, where that instruction encoding switches the current mode from one of touch/non-touch mode to the other and execution of the same instruction a second time then switches the current mode back again. A touch mode indicator may be stored in a control register to indicate whether the current mode is the touch mode or non-touch mode. This touch mode indicator may be updated in response to the touch entry/exit instructions. In some implementations, the current mode may not carry over to higher exception levels when an exception or interrupt is received (e.g. even if the background code was executed in touch mode before the exception occurred, the exception handler could still be executed in non-touch mode). In such implementations, in response to an exception occurring during background processing, the touch mode indicator can be saved to memory (along with other architectural state associated with the background processing). The saved state (including the touch mode indicator) may be restored to architectural registers when returning from the handling of the exception, so that after returning from the exception the background code will continue to run in the same one of the touch mode and non-touch mode that it was executing in before the exception happened.

It will be appreciated that the MRS instruction is just one example of a non-touch instruction which accesses state restricted for access by higher privilege levels (EL1-EL3). Other examples could include an instruction for transferring a data value from the system register 186 to a general purpose register, or an instruction for triggering a load or store operation to a memory location identified by a target address derived from the stack pointer stored in one of the stack pointer registers 185, 187, 188 corresponding to states EL1-EL3 respectively. Hence, there may be a number of different types of instruction which could have their behaviour modified by the touch prefix or touch mode instructions.

Figure 9:
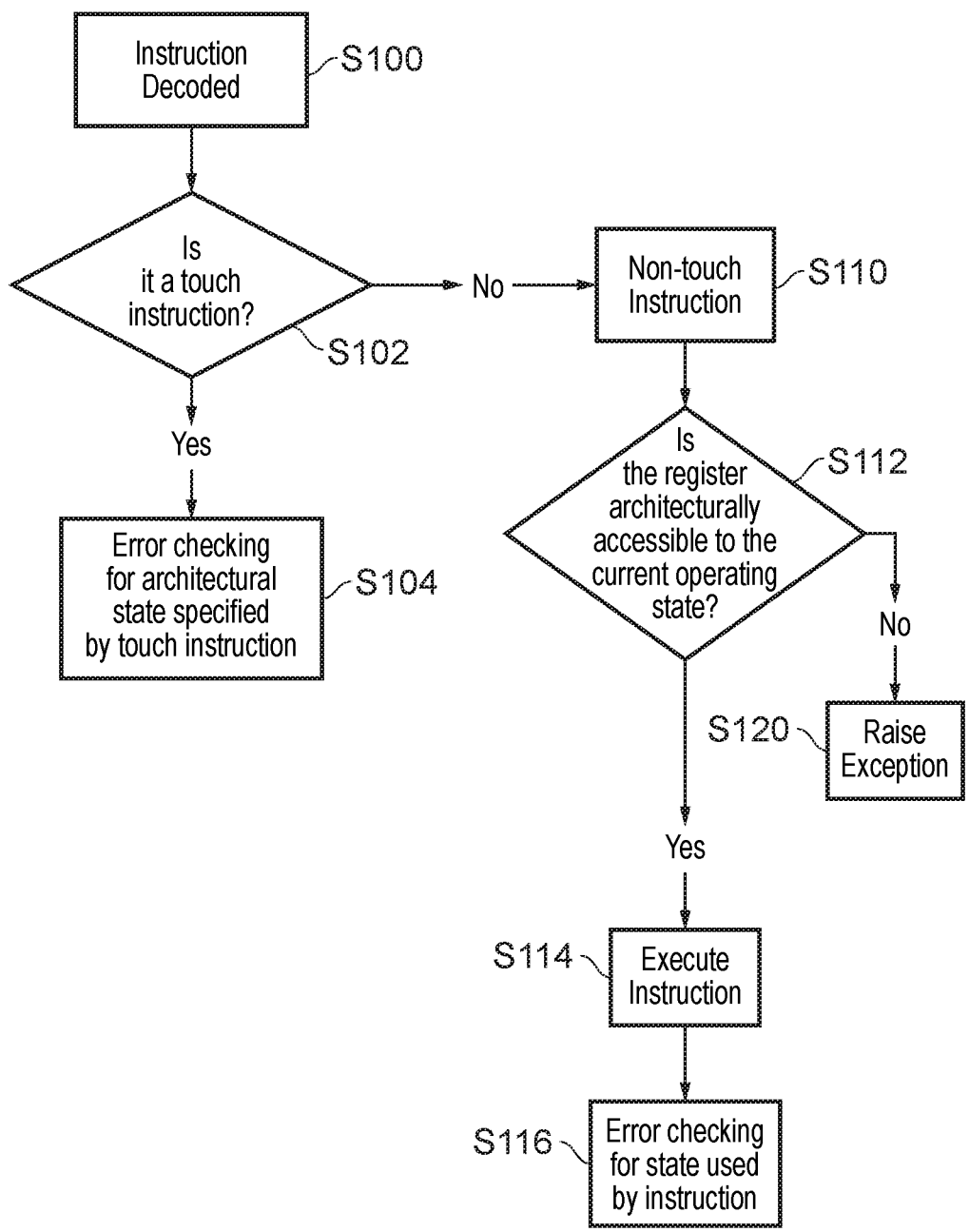
FIG. 9 shows a flow diagram illustrating steps in a method for processing instructions and triggering error checking.

FIG. 9 illustrates a method for triggering error checking circuitry according to one embodiment. At step S100 an instruction is decoded, at step S102 it is determined whether or not the instruction is identified as a touch instruction. Here, the "touch instruction" could either be the dedicated touch instruction identified by a specific "touch instruction" opcode, or a non-touch instruction which is being treated as a touch instruction due to the inclusion of the touch prefix or touch mode entry instruction. If the instruction is classified as a non-touch instruction S110, the method continues; next determining at step S112 whether the architectural state to be updated or accessed by the instruction is architecturally accessible in the current operating state. If this is not the case, an exception is raised S120 and an exception handling procedure will be followed. If the selected architectural state is architecturally accessible in the current operating state, the instruction will be executed at step S114. The error checking circuitry may be activated S116 for the state used by the instruction (at least for some types of instructions such as a move instruction).

If at step S102 the instruction is determined to be a touch instruction, the error checking for the architectural element selected by the instruction is triggered at step S104. It will be appreciated that depending on the specifics of the system, the touch instruction may trigger another process or operation, which in turn triggers the error checking circuitry. In this way, the error checking circuitry is triggered on the selected architectural element, independent of whether it is architecturally accessible in the current operating state.

Furthermore, the error checking circuitry in both steps S104 & S116 may be the same circuitry.

Further information on the use of touch instructions is provided in the following sections.

1 Summary

Latent faults describe errors in architectural state that build up over time which do not necessarily interrupt the running of the system. In particular, state corresponding to higher execution levels (ELs) is rarely exercised and thereby susceptible to latent faults. If two such faults affect a rarely used state, the underlying fault detection/correction circuitry might no longer be able to operate correctly. For example, the comparators matching output coming from a triple-core lockstep system require at least two outputs to match in order to correct faults. Moreover, parity bits may not be able to even detect multi-bit faults. Some systems reset cores every few minutes to limit the potential build-up of latent faults.

We propose touch instructions, as a means to exercise architectural state in a software transparent way; i.e. without modifying or revealing it. This would enable code executed in lower ELs (e.g. user level) to cover state corresponding to higher ELs. Existing fault handling mechanisms could thereby detect/correct latent faults that would otherwise be architecturally inaccessible without transitioning to higher ELs. The operations performed by touch instructions are implementation dependent. For instance, an ECC protected register might be read, its ECC evaluated and the correct value written-back if necessary. While a triple-core system might introduce small hardware changes to match this behaviour, it might alternatively split touch instruction into two micro-operations (uOps); one to transfer state into a dummy register and one to write this register to a dummy memory location. The dummy register would be software transparent and the dummy address would indicate to the comparator circuitry that the incoming values should be matched against each other, but not written out to memory.

The number of instructions needed may be kept to a minimum, e.g. only system registers and EL specific banked registers (SP_EL0/1/2/3) would need to be covered. Anything accessible by EL0, used for non-architectural state (e.g. branch tables) or short-term storage (e.g. queue structures) would either be handled by conventional instructions or considered insensitive to latent faults. Some benefits of the proposal include increased portability (no need to modify OS, hypervisor or secure monitor) and increased performance (no transitions to higher ELs, no frequent core resets, no need for BIST).

2 Motivation

ISO 26262 describes latent faults as multiple-point faults that are not detected by safety mechanisms within a given period of time. In other words, faults that build up over time without affecting a system. The interval between the occurrence of a single-point fault and its detection is called vulnerability interval. A second fault during this interval would incur a multiple-point fault (e.g. see FIG. 4).

Most systems can handle multiple-point faults to orthogonal components, but are vulnerable to faults affecting rarely exercised state; e.g. parity bits only permit detection of single bit errors and error correction codes (ECC) increase significantly in complexity with the number of detectable bit errors. Even triple core lockstep (LS) systems are unable to correct or even detect multiple-point faults to rarely exercised state, as their comparators are unable to decide which one of three mismatching input values is correct and which are erroneous.

Particular to latent faults is the need to test all architectural state, including registers and flags corresponding to higher execution levels (ELs). Hence, software BISTs (Binary Self Tests) would need to be at least partially executed in higher ELs, increasing security risks and further degrading performance due to transition costs. The time between successive tests depends on expected error rates and the impact of potential errors. Tests can be run every few seconds and cores reset every few minutes to avoid build-up of latent faults.

3 Touch Instructions

Touch instructions exercise architectural state in a software transparent way; i.e. without modifying or revealing it. This would enable code executed in lower exception levels (ELs) (e.g. user level) to cover state corresponding to higher ELs. Existing fault handling mechanisms could thereby detect/correct latent faults that would otherwise be inaccessible without transitioning to higher ELs. Advantages of this method include, but may not be limited to:

Increased performance:
  No need to transition to higher ELs during software BIST (relevant given the short interval between successive test cycles)
  No need to reset cores every few minutes in case of software BIST not being able to cover higher EIs' state
  No need for software BIST, if compiler can ensure that all architectural state is regularly exercised (Sec. 0). Hardware may handle the fault detection/correction for the exercised architectural state. Touch instructions do not return information that would allow software to handle faults—the touch instructions are software transparent for security reasons.
  Touch instructions are fast (no write-back or forwarding of operands) and can be processed in parallel (don't depend on data, just register availability)

Increased portability:
  Software BIST can be written for and executed in EL0, so no need to modify higher level code, e.g. OS, hypervisor or secure monitor Increased security:
  No need to transition to higher ELs during testing
  Touch instructions are executed software transparent without needing to know the content of the state being exercised; hence, no need for branches based on privilege state and reduced risk of information leaks via general-purpose registers (GPRs) or memory
  Touch instructions are timing invariant with respect to data (fault may incur latency penalties based on the underlying hardware mechanisms, but this would likely be the same for software BIST or any other error handling scheme)

Reduced power consumption:
  The low cost of touch instructions would enable more frequent test runs.
  Hence, designs may operate at lower supply voltages to reduce power consumption, while compensating for higher error rates with more frequent tests.

Increased scope
  Implicit touch instructions as described in Section 0 can be extended to trigger hardware based tests beyond exercising architectural state. For instance, they could trigger a cycle of hardware BIST or tests on coprocessor components The state that needs to be exercised by touch instructions may be limited to registers not accessible by EL0 (or EL1 depending on the implementation variant chosen). In particular:

System registers
  For the Arm® V8 architecture, this could include all registers usually accessed via MRS or MSR instructions (current cache size ID register, secure configuration register, . . . ). It will be appreciated that the touch instructions could also be applied to other instruction set architectures.

Registers banked by execution level
  E.g. stack pointer, exception link register, saved process status register Touch instructions do not need to cover short term state and state already accessible by low privilege code. This assumes the absence of extended idle periods. If a core is set to sleep or another reduce power state, the process state may be checkpointed or the core regularly woken up to avoid the build-up of latent faults. State not exercised by touch instruction includes:

Anything accessible by EL0 (maybe EL1): general purpose registers, program counter, condition flags, vector registers, etc.

Non-architectural state: branch prediction tables, prefetcher tables, etc.

Any short term architectural state: register rename tables, queues (expected to drain within vulnerability interval), reorder buffer, etc.

The operations performed by touch instruction dependent on the chosen implementation variant (following sections) and the underlying hardware fault handling mechanism. For instance, Hardware unable to handle faults would treat touch instructions as NOPs (no operation). It could be beneficial to indicate the presence or absence of fault handling mechanism as a bit in the processor status register. A software handler could then be executed conditionally based on this bit.

An intra-core LS core would treat touch instructions like reads without write-back functionality, i.e. read register, match value against redundant state (e.g. $2^{nd}$ register copy and parity bit, or ECC), correct detected faults, repeat until read is successful or permanent fault detected.

A dual- or triple-core system might introduce small hardware changes to match the intra-core LS behaviour for selected registers. Alternatively, they may split touch instruction into two micro-operations (uOps). One to transfer state into a dummy register and one to write this register to a dummy memory location. The dummy register would not be otherwise accessible by software and the dummy address would indicate to the comparator circuitry that the incoming values should be matched against each other, but not written out to memory.

4 Implementation Variant A—Explicit Instructions

An explicit implementation of a touch instruction requires an opcode plus one operand specifying the system register or banked register to be accessed. The resulting code sequence may look as follows:

---

Touch ACTLR_EL1    Touch ACTLR_ELn    // Auxiliary Control Register for EL1,2,3
Touch ACTLR_EL2
Touch ACTLR_EL3

| | | |
|---|---|---|
| Touch CCSIDR_EL1 | Touch CCSIDR_EL1 | // Current Cache Size ID Register |
| Touch CLIDR_EL1 | Touch CLIDR_ELn | // Cache Level ID Register for EL1,2,3 |
| Touch CLIDR_EL2 | | |
| Touch CLIDR_EL3 | | |
| ... | ... | |

The "ELn" variants in the above code sequences represent instructions that need to be cracked by hardware into multiple uOps to exercise all relevant registers. They exploit the fact that touch instructions operate independently of execution levels to reduce the number of opcode bits required and increase code density. In case of a dual-/triple-core variant as described in the previous section (each touch instructions may be split into move & store uOps to trigger the error checking).

5 Implementation Variant B— Implicit Instruction
   Mov Rn, 0
   touch_loop: Touch Rn
   B.cond<touch_loop>
   Cbz<fault_handling_not_implemented>

The above code sequence exemplifies the use of implicit touch instructions. After initializing a general-purpose register, a touch instruction using said register is looped over until a specific condition is reached (e.g. an NZCV flag set or cleared). The idea behind this instruction variant is to reduce opcode overheads, improve code density and provide more flexibility to hardware. To further reduce opcode overheads, the register operand may be fixed to an implicit register rather than any GPR (e.g. R0 rather than Rn). The instruction might show the following behaviour:
   Value in Rn<=max
      Touch state corresponding to value in Rn; increment Rn
      State to be touched is implementation dependent
      E.g. 0 indicates selected architectural state is SP_EL1, 1 indicates selected architectural state is SP_EL2, etc.
   Value in Rn>max
      Set/clear a condition flag to indicate no hardware support implemented for value in Rn The purpose of the optional "compare and branch on zero" (Cbz) instruction listed in the example above is to handle the case of no hardware fault support being implemented. In this case, the loop exit condition is met, while Rn remains at 0. The subsequently executed code might trigger a software BIST routine. Note that this behaviour is not necessary in case of a processor status bit indicating the presence/absence of hardware fault handling mechanisms. This would allow the uOp incrementing Rn as part of the touch instruction to be executed unconditionally (potentially faster).

The "max" value mentioned above is implementation dependent. It enables designs to customize the degree to which they support the handling of latent faults. For instance:
   max=0:
      Perform all checks as monolithic block
      For example, trigger a hardware self-test routine or enter a sequence of hardware specific micro-code
   max>0:
      Implement one instruction per register or group of registers to be touched (similar to explicit instructions variants in Sec. 4)
      Also permits "touching" of other structures, e.g. processor internal state that would otherwise be hard to test or coprocessor state 6 Other Implementation Variants The previous two sections include the implementation variants currently considered most likely to be chosen. This section summarizes a number of alternatives, it will be appreciated that this is by no means exhaustive.

Touch using Metadata & Instr. held in General Purpose Register (GPR)
   Ldr Rn, #<simm>//Load metadata & instruction into Rn
   Touch Rn
      Load metadata and touch variant of an instruction to upper and lower half of a GPR, respectively
      Touch instruction transfers metadata & instruction to fetch/decode circuitry
      Instruction is then executed as "touch" variant; metadata indicates execution level when exercising banked registers (e.g. SP_EL1, SP_EL2 or SP_EL3)
   Advantages:
      Low opcode overhead (1 instr.+1 GPR operand); can be reduced further by making the GPR operand implicit
      Relatively simple decode logic; e.g. same instruction without write-back Touch using Metadata & Instr. held in Vector Register
   Same as above, but use vector register to hold "touch" variants for multiple instructions
   Advantage:
      Potentially somewhat faster Touch Prefix
   Prefix certain regular instruction
      Touch variants of MRS/MSR and MRC
      Still would provide additional Touch_ELn variants (similar to the examples of sections 4 and 5) for instructions exercising banked registers (e.g. stack pointer registers 185, 187, 188), but the use of touch prefix can reduce the number of dedicated touch instructions required.
   Advantage:
      Flexible; instructions supporting the touch prefix could be implementation dependent (NOP if not supported)

Touch Mode
Touch instruction enables/disables "touch" mode
   Subset of instructions executed in this mode are treated as touch instruction, e.g.
   MRS, MSR and MRC
      Still would provide additional touch instruction (similar to the examples of sections 4 and 5) to touch banked registers, e.g. stack pointer, link register
   Advantage:
      Smaller opcode overhead as some existing instructions can be re-used Trigger Micro Code
   Use touch instruction or hardware internal timer to trigger execution of micro-code held in separate memory (e.g. read only memory).

Similar to "max=0" case described in Sec. 0

Advantage:

Flexible; micro-code might perform any sequence of hardware specific tests

7 Security

Allowing low level code to exercise architectural state of higher execution levels may be perceived as a security risk. However, touch instructions—by definition—do not read or modify state. Instead, they trigger existing fault detection and/or recovery mechanisms; e.g. evaluate a register value against its corresponding ECC and correct the value if necessary. They are timing invariant as they operate independent of the data being touched.

An observer may be able to determine the presence of faults based on variations in execution time. This is based on the delays introduced by hardware when detecting/correcting any fault, not just those exercised by touch instructions. Either way, this only reveals information on the presence of faults and not the values held pre- or post-recovery.

8 Integration of Touch Instructions

There are several ways to integrate touch instruction into the normal execution flow. One of the simplest is to add a sequence of all supported touch instructions to regular software BIST routines. This ensures that latent faults are handled at the same rate as regular faults.

Another option is to utilize compiler specific knowledge to avoid the performance impact of context switching to software BIST routines and executing unnecessary touch instructions. In particular, The compiler tracks how often registers are exercised under normal conditions It ensures that all registers are exercised regularly (e.g. at least once within 100,000 cycles); to do so it might Break long running loops and change register allocations between parts (e.g. first and second part use lower and upper 16 registers, respectively), or Insert dummy reads (e.g. mov to same register)

Insert sequence of touch instructions to exercise state in higher ELs (sequence might be made dependent on which ELs are actually implemented; safes some time in case of EL2 or EL3 not being present)

To further reduce the performance impact of touch instructions, higher ELs might be designed with an increased tolerance for multiple-point faults to lengthen the permissible interval between touch instructions. For instance, checkpointing might be combined with ECC or similar mechanisms to allow otherwise unrecoverable (but still detectable) faults to be handled successfully. While it would also be feasible to extend processor internal ECC mechanisms to handle an increased number of faults, this would likely incur additional hardware cost and potentially additional performance overheads. Providing different ECC variants tailored to each EL might reduce the overall performance overhead, but would increase hardware complexity even further.

In practice, a combination of the methods above or other alternatives might be used to trade-off compiler complexity, hardware costs and performance overheads.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:

processing circuitry to perform data processing in one of a plurality of operating states;

an instruction decoder to decode instructions to generate control signals for controlling the processing circuitry to perform data processing; and error checking circuitry to perform error checking operations on architectural state data;

in which:

in response to a touch instruction, the instruction decoder is configured to trigger the error checking circuitry to perform an error checking operation on selected architectural state data; and the touch instruction is permitted to be executed in at least one operating state for which the selected architectural state data is architecturally inaccessible to said at least one operating state;

wherein at least when the error checking operation identifies that the selected architectural state data is correct, in response to the touch instruction the processing circuitry is configured to leave the selected architectural state data unchanged.

2. The apparatus according to claim 1, wherein said plurality of operating states comprise states with different levels of privilege.

3. The apparatus according to claim 2, wherein the selected architectural state data is restricted to be architecturally accessible to one or more operating states with at least a threshold level of privilege, and said at least one operating state comprises a less privileged operating state than said operating states with at least said threshold level of privilege.

4. The apparatus according to claim 1, wherein in response to the touch instruction when executed in said at least one operating state, the processing circuitry is configured to make the selected architectural state data accessible to the error checking circuitry but prevent the selected architectural state data becoming architecturally visible to subsequent instructions executed in said at least one operating state.

5. The apparatus according to claim 1, wherein the touch instruction has a dedicated opcode distinguishing the touch instruction from non-touch instructions.

6. The apparatus according to claim 1, wherein in response to a touch prefix instruction, the instruction decoder is configured to decode a subsequent non-touch instruction as said touch instruction.

7. The apparatus according to claim 6, wherein for the subsequent non-touch instruction decoded as said touch instruction, the selected architectural state data is selected depending on a property of the touch prefix instruction.

8. The apparatus according to claim 1, wherein in response to a touch mode entry instruction, the instruction decoder is configured to decode at least a subset of subsequent non-touch instructions, which appear in program order between the touch mode entry instruction and a touch mode exit instruction, as touch instructions.

9. The apparatus according to claim 1, wherein at least part of the instruction encoding of the touch instruction specifies which architectural state data is the selected architectural state data.

10. The apparatus according to claim 1, wherein the instruction encoding of the touch instruction specifies a register identifier identifying a register for storing an indication of which architectural state data is the selected architectural state data.

11. The apparatus according to claim 10, wherein the processing circuitry is configured to update the indication stored in the register in response to the touch instruction.

12. The apparatus according to claim 1, wherein the instruction encoding of the touch instruction specifies a vector register for storing a plurality of indications indicative of a plurality of items of selected architectural state data, and in response to the touch instruction the processing circuitry is configured to trigger the error checking circuitry to perform the error checking operation on each of the plurality of items of selected architectural state data.

13. The apparatus according to claim 1, wherein the instruction decoder is configured to map the touch instruction to at least one micro-operation including a store micro-operation specifying a value of the selected architectural state data as target data to be stored to memory and specifying a dummy address as a target address,
said dummy address indicating that writing of the target data to memory should be suppressed; and
in response to the store micro-operation specifying the dummy address, the processing circuitry is configured to trigger the error checking operation on the value of the selected architectural state data.

14. The apparatus according to claim 1, wherein in response to a non-touch instruction for accessing a given item of architectural state data, the instruction decoder is configured to control the error checking circuitry to perform the error checking operation on the given item of architectural state data; and
the non-touch instruction is prohibited from being executed in at least one operating state for which the given item of architectural state data is architecturally inaccessible to said at least one operating state.

15. The apparatus according to claim 1 wherein the error checking operation comprises checking of an error detection code associated with the selected architectural state data.

16. The apparatus according to claim 1, wherein the processing circuitry is configured to perform a plurality of instances of redundant processing of the same processing workload; and
the error checking operation performed in response to the touch instruction comprises comparing the selected architectural state data from said plurality of instances of redundant processing.

17. The apparatus according to claim 16, wherein the processing circuitry comprises a plurality of processing units each to perform one of the plurality of instances of redundant processing in parallel.

18. The apparatus according to claim 1, wherein the error checking circuitry comprises at least one of:
dedicated hardware circuitry to perform the error checking operation; and
the processing circuitry to perform the error checking operation under control of error checking micro-code.

19. An apparatus comprising:
means for performing data processing in one of a plurality of operating states;
means for decoding instructions to generate control signals for controlling the means for performing data processing to perform the data processing; and
means for performing error checking operations on architectural state data; in which:
in response to a touch instruction, the means for decoding instructions is configured to control the means for performing error checking operations to perform an error checking operation on selected architectural state data; and
the touch instruction is permitted to be executed in at least one operating state for which the selected architectural state data is architecturally inaccessible to said at least one operating state;
wherein at least when the error checking operation identifies that the selected architectural state data is correct, in response to the touch instruction the means for data processing is configured to leave the selected architectural state data unchanged.

20. A data processing method for an apparatus comprising processing circuitry to perform data processing in one of a plurality of operating states; the method comprising:
decoding instructions using an instruction decoder to generate control signals for controlling the processing circuitry to perform data processing; and
in response to decoding of a touch instruction by the instruction decoder, performing an error checking operation on selected architectural state data; in which:
the touch instruction is permitted to be executed in at least one operating state for which the selected architectural state data is architecturally inaccessible to said at least one operating state;
wherein at least when the error checking operation identifies that the selected architectural state data is correct, in response to the touch instruction the processing circuitry is configured to leave the selected architectural state data unchanged.

* * * * *